Sept. 19, 1950  J. L. SELMAN  2,522,843
NUT-HULLING MACHINE
Filed Jan. 21, 1948  2 Sheets-Sheet 1

Inventor
John L. Selman

By Clarence A. O'Brien
and Harvey B. Jacobson
Attorneys

Sept. 19, 1950      J. L. SELMAN      2,522,843
NUT-HULLING MACHINE

Filed Jan. 21, 1948      2 Sheets—Sheet 2

Inventor
John L. Selman

By Clarence A. O'Brien
and Harvey B. Jacobson
Attorneys

Patented Sept. 19, 1950

2,522,843

UNITED STATES PATENT OFFICE 2,522,843

NUT HULLING MACHINE

John L. Selman, Muskogee, Okla.

Application January 21, 1948, Serial No. 3,580

2 Claims. (Cl. 146—301)

1

The present invention relates to new and useful improvements in hulling machines and more particularly to machines for hulling tung nuts, peanuts or for cutting the hulls from the meat of various types of nuts for preparing the meats for the extraction of oil therefrom in oil machines.

An important object of this invention is to provide a hulling machine including the provision of co-acting stationary and horizontal rotating cutters to effectively remove the hulls without danger of mashing or crushing the meats of the nuts into the hulls and which results in a great loss in absorption of oil in the hulls, with novel means for adjusting the cutters relative to each other.

A further object of the invention is to provide a hulling machine constructed to separate the hulls from the nuts without the creation of the usual dust caused by hammer mills or other types of seed hullers and to further provide a machine in which the nuts are cut into more uniform particles for more effectively extracting the oils by the crushing rolls of an oil mill.

Another object of the invention is to provide a hulling machine in which the nuts are fed into a vertical cylinder having coacting stationary and horizontally rotating cutters therein and including the provision of a door in one side of the cylinder to automatically open for the discharge of any foreign matter, such as scrap iron or the like which might have a tendency to damage the machine.

A still further object is to provide a machine of this character of simple and practical construction, which is efficient and reliable in operation, relatively inexpensive to manufacture and maintain in operation and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

2

Figures 1, 2, 3:
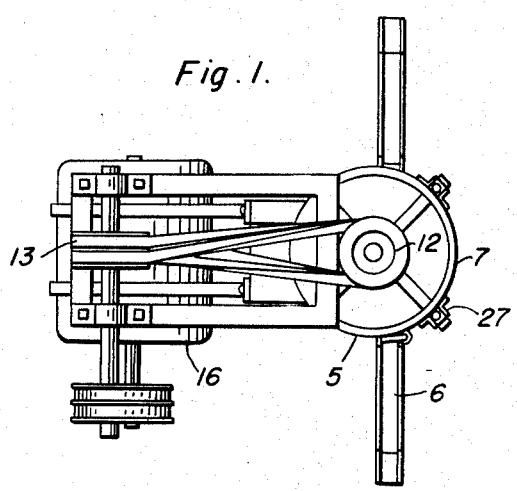
Figure 1 is a top plan view.
Figure 2 is a side elevational view.
Figure 3 is a rear elevational view.
Figure 4:
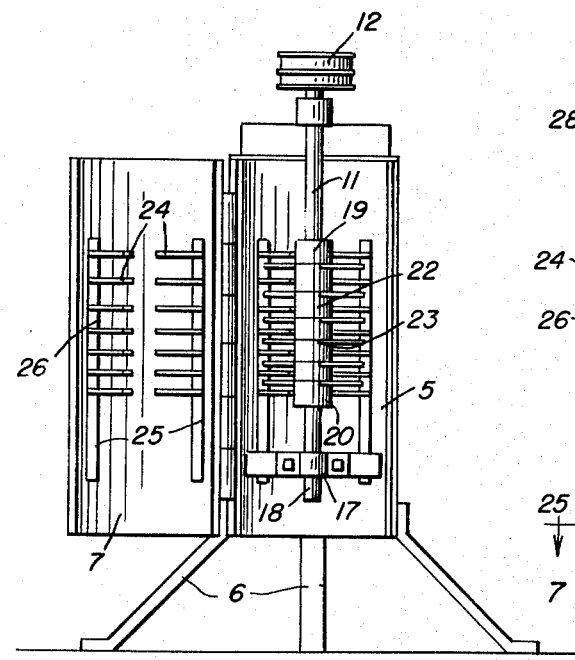
Figure 4 is a front elevational view with the door in open position.
Figure 6:
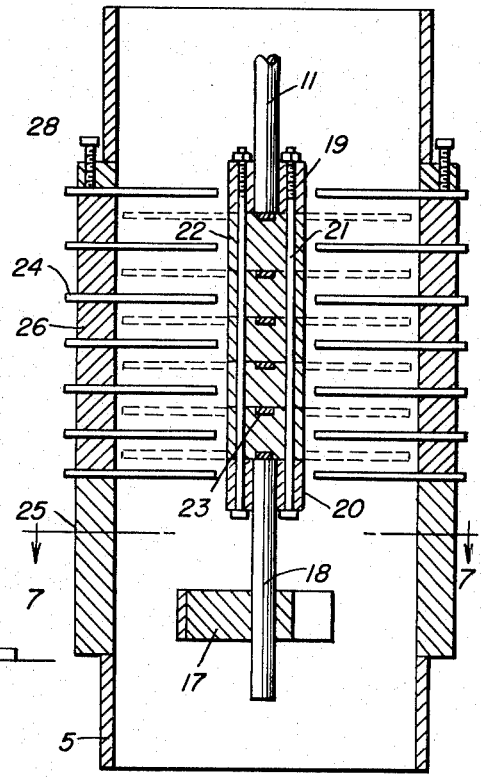
Figure 6 is an enlarged vertical sectional view taken on a line 6—6 of Figure 5.
Figure 5:
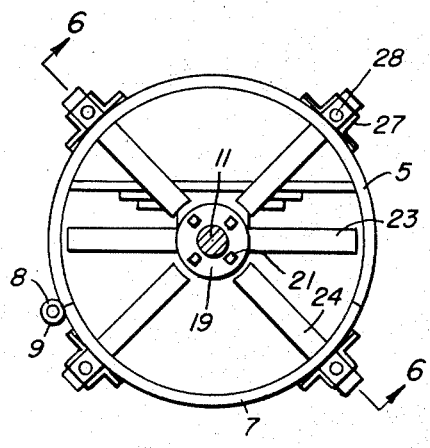
Figure 5 is a transverse sectional view taken substantially on the line 5—5 of Figure 2.
Figure 7:
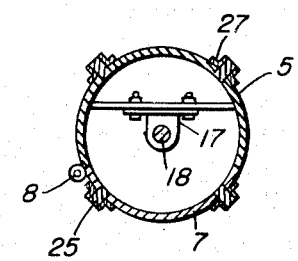

Figure 7 is a transverse sectional view on a reduced scale, taken substantially on a line 7—7 of Figure 6.

Referring now to the drawings in detail wherein for the purpose of illustration I have disclosed a preferred embodiment of the invention, the numeral 5 designates the hulling cylinder supported in an upright position on legs 6, the cylinder being open at each end.

The cylinder is provided at its front with a door 7 hingedly connected at one edge by a conventional type of hinge structure 8 for horizontal opening and closing movement.

An upper bearing bracket 10 is supported above the top of the cylinder in which an upper shaft 11 is journalled driven by belts and pulleys 12 from idler pulleys 13 journalled on a supporting bracket 14 at the rear of the cylinder, the idler pulleys being driven by a belt 15 from a motor 16 suitably secured at the rear of the cylinder.

A lower bearing bracket 17 is also secured in the lower portion of the cylinder 5 and in which a lower vertical shaft 18 is journalled.

An upper collar 19 is secured to the lower end of upper shaft 11 and a lower collar 20 is secured to the upper end of lower shaft 18, the collars being connected to each other by vertical bolts 21 and to which are also secured a plurality of spacing blocks 22.

Each of the spacing blocks is provided with a plurality of radially extending cutting knives 23 for horizontal rotation between stationary knives 24 projecting into the cylinder from knife supports 25 secured at diametrically opposite sides of the cylinder and to the door 7.

The knife supports 25 comprise a plurality of spacing blocks 26 supported in superposed relation in vertical guides 27 secured to the sides of the cylinder 5 and door 7.

The knives 24 are clamped between the spacing blocks 26 by a clamping screw 28 at the top of the guide 27 and the spacing blocks 22 and 26 are of gradually reduced thickness toward the bottom to space the knives 23 and 24 a greater distance apart toward the top of the cylinder to provide coarse and fine cutters leading from top to bottom.

In the operation of the device, nuts are fed into the top of cylinder 5 to pass downwardly therethrough as the cutters 23 are rotated to thus cut and remove the hulls from the nuts.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention what is claimed as new is:

1. A hulling machine comprising a vertical cylinder, a plurality of vertically spaced apart, radially positioned stationary knives supported in the cylinder, an upper vertical shaft journaled centrally in the cylinder, a lower vertical shaft journaled centrally in the cylinder, collars fixed to the adjacent ends of the upper and lower shafts, an intermediate vertical shaft composed of a plurality of superposed spacing blocks, rods extending vertically through the blocks and also extending vertically through the collars and rigidly connecting the blocks in assembled relation to each other as well as to the collars to connect the intermediate shaft to the upper and lower shafts, and a plurality of radially positioned rotary knives secured between the spacing blocks and working between the stationary knives.

2. A hulling machine comprising a vertical cylinder, a plurality of radially positioned vertically spaced apart stationary knives supported in the cylinder, upper and lower vertical shafts journaled centrally in the cylinder and having collars fixed to their adjacent ends, an intermediate vertical shaft composed of a plurality of superposed units, rods extending vertically through said superposed units and also extending vertically through the collars and rigidly connecting the units in assembled relation to each other and to the collars, and rotary knives held at their central portions in a clamped position between the units of the intermediate shaft and projecting radially from opposite sides thereof and working between the stationary knives.

JOHN L. SELMAN.

REFERENCES CITED

The following references are of record in the file of this patent:

UNITED STATES PATENTS

| Number | Name | Date |
|---|---|---|
| 940 | Carver | Sept. 22, 1838 |
| 84,723 | Wright | Dec. 8, 1868 |
| 426,738 | Pickett | Apr. 29, 1890 |
| 522,996 | Mead | July 17, 1894 |
| 723,157 | Hunt | Mar. 17, 1903 |
| 1,977,955 | Robinson | Oct. 23, 1934 |
| 2,318,904 | Thompson | May 11, 1943 |